United States Patent
Kanno

(10) Patent No.: US 6,494,188 B1
(45) Date of Patent: Dec. 17, 2002

(54) FUEL INJECTION CONTROL SYSTEM FOR MARINE ENGINES

(75) Inventor: Isao Kanno, Shizuoka (JP)

(73) Assignee: Sanshin Kogyo Kabushiki Kaisha (JP)

( * ) Notice: Subject to any disclaimer, the term of this patent is extended or adjusted under 35 U.S.C. 154(b) by 41 days.

(21) Appl. No.: 09/704,015

(22) Filed: Nov. 1, 2000

(30) Foreign Application Priority Data

Nov. 1, 1999 (JP) .......................................... 11-310797

(51) Int. Cl.$^7$ .............................................. F02M 51/00
(52) U.S. Cl. ..................................................... 123/491
(58) Field of Search ................................ 123/336, 491, 123/492, 494, 478, 480

(56) References Cited

U.S. PATENT DOCUMENTS

| | | | |
|---|---|---|---|
| 5,140,964 A | * | 8/1992 | Torigai ........................ 123/492 |
| 5,146,899 A | | 9/1992 | Tanaka et al. |
| 5,243,945 A | | 9/1993 | Katoh et al. |
| 5,251,582 A | | 10/1993 | Mochizuki |
| 5,269,243 A | | 12/1993 | Mochizuki |
| 5,322,044 A | | 6/1994 | Maebashi |
| 5,448,974 A | | 9/1995 | Toda |
| 5,450,828 A | | 9/1995 | Sakamoto et al. |
| 5,462,031 A | | 10/1995 | Kai |
| 5,522,360 A | | 6/1996 | Suzuki et al. |
| 5,595,162 A | * | 1/1997 | Iwai ............................ 123/491 |
| 5,626,120 A | | 5/1997 | Akatsuka |
| 5,655,500 A | | 8/1997 | Kato |
| 5,665,025 A | | 9/1997 | Katoh |
| 5,687,700 A | | 11/1997 | Kato |
| 5,794,605 A | | 8/1998 | Kato |
| 5,937,825 A | | 8/1999 | Motose |
| 5,941,223 A | | 8/1999 | Kato |
| 6,286,472 B1 | * | 9/2001 | Takahashi et al. ..... 123/184.34 |

OTHER PUBLICATIONS

Co–pending application, Serila No. 09/708,900, filed on Nov. 8, 2000, entitled Marine Engine Control System, in the name of Isao Kanno, and assigned to Sanshin Kogyo Kabushiki Kaisha.
Co–pendgin application, Serila No. 09/704,470, filed on Nov. 1, 2000, entitled Fuel Injection System For Marine Propulsion Device, in the name Isao Kanno, and assigned to Sanshin Kogyo Kabushiki Kaisha.

* cited by examiner

Primary Examiner—Paul J. Hirsch
Assistant Examiner—Arnold Castro
(74) Attorney, Agent, or Firm—Knobbe, Martens, Olson & Bear, LLP

(57) ABSTRACT

An internal combustion engine is fuel injected. A controller either detects or calculates engine speed, throttle angle and a rate of change of the throttle angle. A first fuel injection amount is preset during a preset period of time following engine starting and subsequently controlled by the controller. While being controlled, an amount of fuel injected is comprised of two components: a base amount determined by engine speed and throttle angle and an additional amount determined by throttle angle and a rate of change in throttle angle. Ignition timing also can be varied in the two component manner as well.

18 Claims, 10 Drawing Sheets

FUEL INJECTION CONTROL SYSTEM FOR MARINE ENGINES

PRIORITY INFORMATION

This invention is based on and claims priority to Japanese Patent Application No. Hei 11-310,797, filed Nov. 1, 1999, the entire contents of which is hereby expressly incorporated by reference.

BACKGROUND OF THE INVENTION

1. Field of the Invention

The present invention generally relates to fuel injection systems for internal combustion engines. More specifically, the present invention relates to control systems for fuel injection systems of such engines.

2. Related Art

In all fields of engine design, there is an increasing emphasis on obtaining more effective emission control, better fuel economy and, at the same time, increasing power output. This trend has resulted in the substitution of fuel injection systems for carburetors as the preferred air-fuel charge former.

Fuel injection systems typically inject fuel into air intake passage(s) or directly into combustion chamber(s) under the control of an electrically operated control unit. The control unit controls a volume of injected fuel. Typically, an engine speed sensor and a throttle valve position sensor are provided and respective signals from these sensors are used for determining suitable fuel volumes depending upon the sensed running condition of the engine. The fuel volumes are defined in a control map stored in the control unit. The control map can define the fuel volumes as corresponding to both the engine speed and the throttle valve position.

The signal from the throttle valve position sensor represents a volume of air introduced into the combustion chamber. The air amount, however, varies due to change of the atmospheric air pressure and other ambient conditions. In addition, the sensed level of air flow can be inaccurate due to flexing of a shaft on which the throttle valves are mounted. For instance, when the engine is being started, the engine may suddenly draw a large amount of air through the induction system and across the throttle valves. This sudden increase in air flow places a radial load on the throttle shaft. The radial load can cause the throttle valve shaft to flex and more air can pass beyond the throttle valves than the throttle valve sensor would indicate. Accordingly, the fuel injection amount may be inaccurate.

SUMMARY OF THE INVENTION

A need therefore exists for a fuel injection control system that would vary the amount of fuel injected during initial starting of the engine. In addition, to provide a more responsive fuel supply system, the amount of fuel injected can vary with engine speed and throttle position with a correction amount of fuel that depending on a rate of throttle position change.

Accordingly, one aspect of the present invention involves an engine for marine applications. The engine comprises at least one cylinder with a piston disposed within said cylinder. A cylinder head encloses a first end of said cylinder. A combustion chamber is at least partially defined by said cylinder, said piston and said cylinder head. An intake passage communicates with said cylinder head. A throttle valve is disposed along said intake passage. A throttle valve position sensor is adapted to detect a position of said throttle valve. A fuel injector is positioned downstream of said throttle valve. A fuel control system is capable of increasing a supplied amount of fuel in proportion to a rate of change of said position of said throttle valve and does not increase said supplied amount of fuel for a preset period following engine start.

Another aspect of the present invention involves a method of controlling a fuel injected engine. The method comprises engaging a starter motor, presetting a first fuel injection amount, decreasing said first fuel injection amount over a preset period of time, sensing a throttle position and controlling said fuel injection amount based at least in part upon said sensed throttle position after said preset period of time has elapsed.

A further aspect of the present invention involves an engine for marine applications. The engine comprises at least one cylinder with a piston disposed within said cylinder. A cylinder head encloses a first end of said cylinder. A combustion chamber is at least partially defined by said cylinder, said piston and said cylinder head. An intake passage communicates with said cylinder head. A throttle valve is disposed along said intake passage. A throttle valve position sensor is adapted to detect a position of said throttle valve. A fuel injector is positioned downstream of said throttle valve. Means are provided for increasing an amount of fuel injected based at least partially upon a rate of throttle valve movement only after a preset period of time has elapsed.

BRIEF DESCRIPTION OF THE DRAWINGS

These and other features, aspects and advantages of the present invention will now be described with reference to the drawings of a preferred embodiment which is intended to illustrate and not to limit the invention. The drawings comprise ten figures.

DETAILED DESCRIPTION OF THE PREFERRED EMBODIMENT OF THE INVENTION

With reference to FIGS. 1 through 6, an outboard motor 30, which employs a control system arranged and configured in accordance with certain features, aspects and advantages of the present invention, will be described. Although the present invention will be shown and described in the context of an outboard motor engine, various features, aspects and advantages of the present invention also can be employed with engines used in other types of marine drives (e.g., a stem drive unit, in-board/outboard drives and personal watercraft jet propulsion unit) and also, for example, with engines used in land vehicles (i.e., motorcycles, snowmobiles and all terrain vehicles) and stationary engines (i.e., generators).

Figure 1:
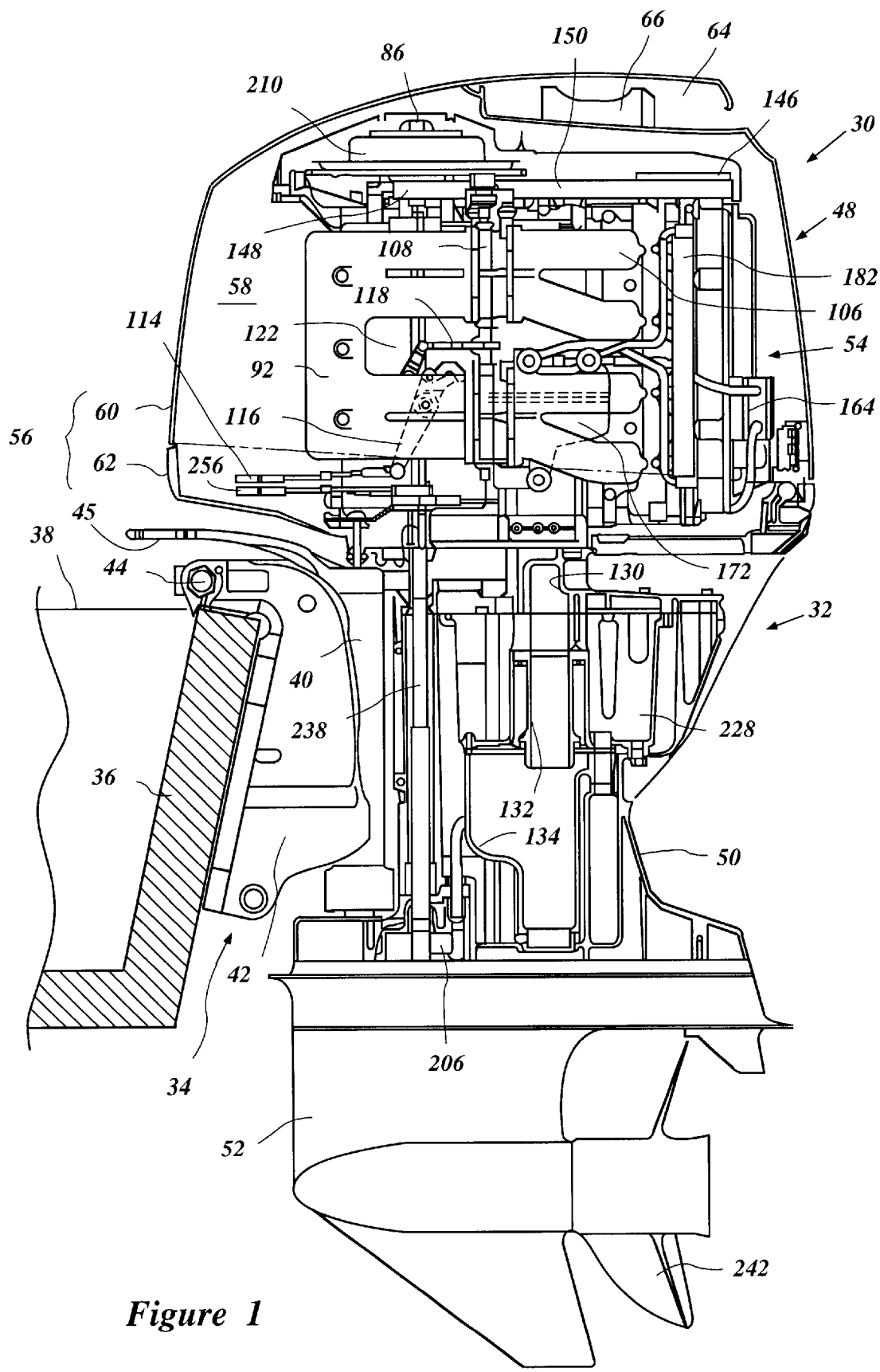
FIG. 1 is a side elevation wire frame view of an outboard motor that has a fuel injection control system configured in accordance with certain features, aspects and advantages of the present invention. An associated watercraft is partially illustrated in this figure as well.

In the illustrated arrangement, the outboard motor 30 comprises a drive unit 32 and a bracket assembly 34. With reference to FIG. 1, the bracket assembly 34 supports the drive unit 32 on a transom 36 of an associated watercraft 38. The drive unit 32 preferably is disposed such that a marine propulsion device is placed in a submerged position with the watercraft 38 resting on the surface of a body of water. The bracket assembly 34 preferably comprises a swivel bracket 40, a clamping bracket 42, a steering shaft and a pivot pin 44.

As is known, the steering shaft typically extends through the swivel bracket 40 and is affixed to the drive unit 32. The steering shaft is journaled for steering movement about a generally vertically extending steering axis, which is defined within the swivel bracket 40. A steering handle 45 can be attached to the steering shaft of the swivel bracket 40 such that the outboard motor 30 can be turned.

The clamping bracket 34 preferably includes a pair of bracket arms that are spaced apart from each other and that are affixed to the watercraft transom 36. The pivot pin 44 completes a hinge coupling between the swivel bracket 40 and the clamping bracket 42. The pivot pin 44 extends through the bracket arms so that the clamping bracket 42 supports the swivel bracket 40 for pivotal movement about a generally horizontally extending tilt axis, which is defined by the pivot pin 44. The illustrated drive unit 32 thus can be tilted or trimmed about the pivot pin 44.

As used through this description, the terms "forward," "forwardly" and "front" mean at or to the side where the bracket assembly 36 is located, and the terms "rear," "reverse," "backwardly" and "rearwardly" mean at or to the opposite side of the front side, unless indicated otherwise or otherwise readily apparent from the context use.

A hydraulic tilt and trim adjustment system (not shown) preferably extends between the swivel bracket 40 and the clamping bracket 42 to raise or lower the swivel bracket 40 and the drive unit 32 relative to the clamping bracket 34. In other arrangements, the outboard motor 30 can have a manually operated system for raising and lowering the drive unit 32.

With continued reference to FIG. 1, the illustrated drive unit 32 includes a power head 48, a driveshaft housing 50 and a lower unit 52. The power head 48 is disposed atop the driveshaft housing 50 and includes an internal combustion engine 54, which is positioned within a protective cowling 56. The protective cowling 56 in the illustrated arrangement defines a generally closed engine compartment 58. The protective cowling 56 preferably comprises a top cowling member 60 and a bottom cowling member 62. The top cowling member 60 can be detachably attached to the bottom cowling 62 so that the operator can access the engine 54 for maintenance or other purposes.

The top cowling 60 preferably comprises a pair of air intake compartments 64 at both rear upper sides thereof. Each compartment 64 generally comprises an air duct 66 that extends generally vertically in the compartment 64. The air intake compartments 64 communicate with the generally closed cavity 58 through the air ducts 66 so that an ambient air can be introduced into the cavity 58 and to the engine 54 for combustion. This configuration reduces the infiltration of water into the protected cavity 58.

Figure 2:
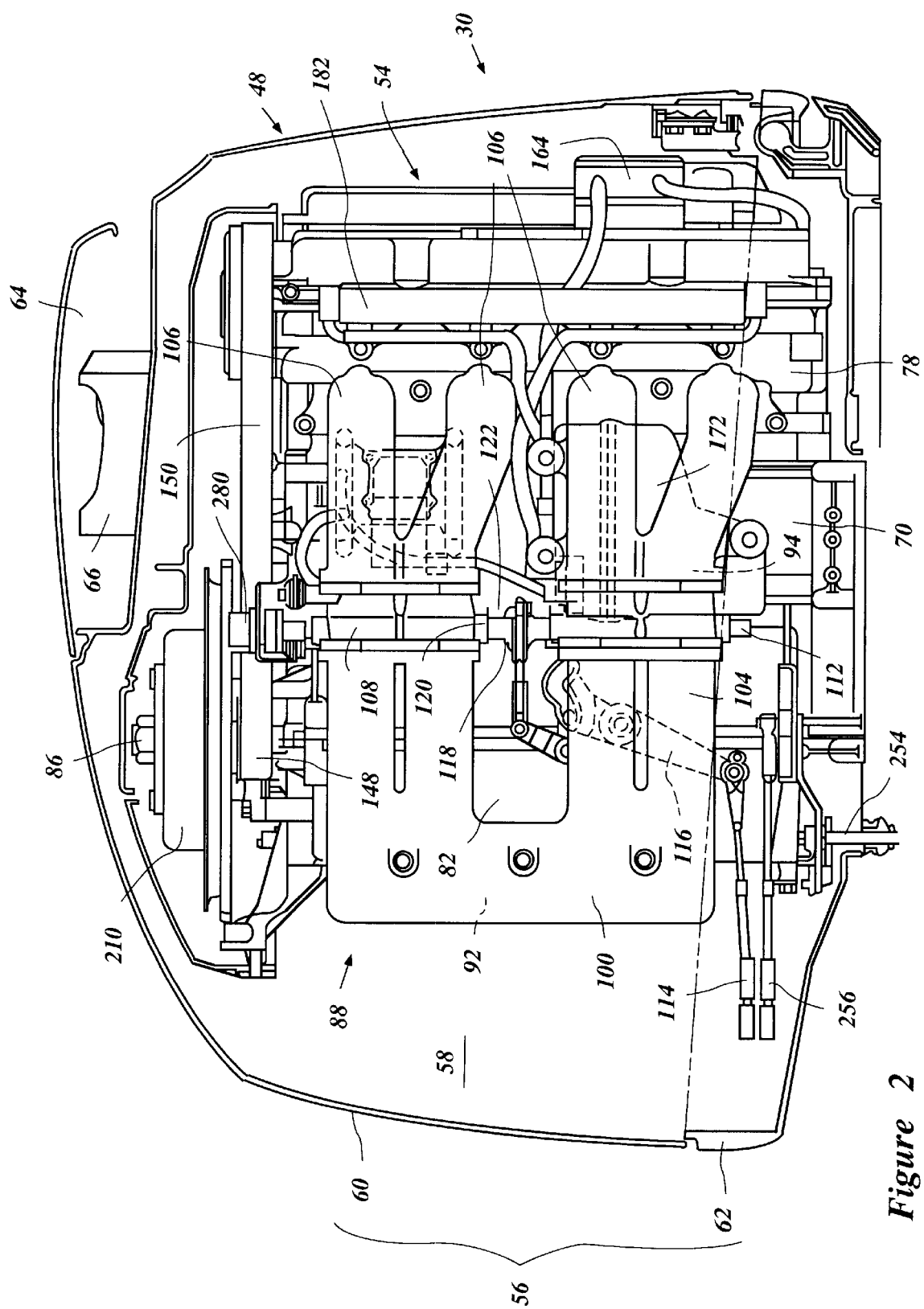
FIG. 2 is an enlarged side view of the power head. A protective cowling is shown in section.
Figure 3:
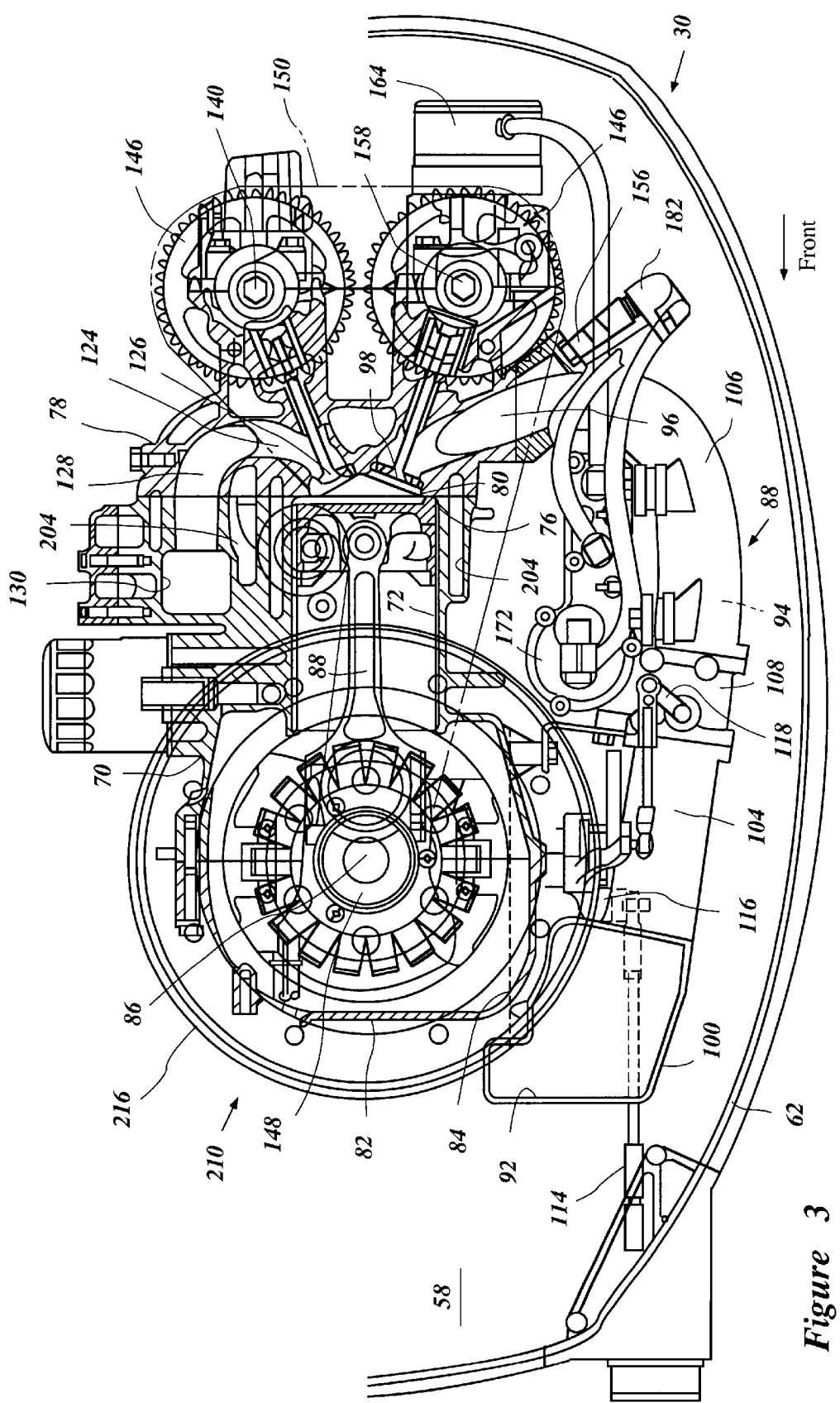
FIG. 3 is an enlarged top plan view of the power head. A top cowling member is detached and a starboard half of a bottom cowling is omitted. A simplified view of the engine also is shown in partial section.

The engine 54 preferably operates on a four-stroke combustion principle. With reference now to FIGS. 2 and 3, the illustrated engine 54 comprises a cylinder block 70 that defines four cylinder bores 72. The cylinder bores 72 are generally horizontally extending and are vertically spaced from one another. This type of engine, however, is exemplary of an engine on which various features, aspects and advantages of the present invention can be used. Engines having other numbers of cylinder bores, having other cylinder arrangements and operating on other combustion principles (e.g., two-stroke crankcase combustion or rotary) all can use at least some of the features, aspects or advantages described herein.

A piston 76 can reciprocate in each cylinder bore 72. In the illustrated arrangement, a cylinder head assembly 78 is affixed to one end of the cylinder block 70 and, together with the pistons 76 and the cylinder bores 72, defines four combustion chambers 80. Of course, in some arrangements, individual cylinder bodies can replace the cylinder block in which a plurality of cylinder bores are formed. A crankcase member 82 preferably closes the other end of the cylinder block 70. Together, the cylinder block 70 and the crankcase member 82 at least partially define a crankcase chamber 84. A crankshaft 86 extends generally vertically through the crankcase chamber 84. The crankshaft 86 preferably is connected to the pistons 76 by connecting rods 88 and is rotated by the reciprocal movement of the pistons 76. In the illustrated arrangement, the crankcase member 82 is located at the most forward position with the cylinder block 70 and the cylinder head assembly 78 extends rearward from the crankcase member 82. These components preferably are mounted in seriatim.

The engine 54 includes an air induction system 88 through which air is introduced into the combustion chambers 80. The induction system 88 preferably includes a plenum chamber 92, four air intake passages 94 and eight intake ports 96. As will be recognized, the number of intake passages 94 and ports 96 can vary. The intake ports 96 are defined in the cylinder head assembly 78. In the illustrated arrangement, two of the intake ports 96 are associated with a single intake passage 94 and both of the intake ports 96 open into a single combustion chamber 80.

The intake ports 96 are repeatedly opened and closed by intake valves 98. When the intake ports 96 are opened (i.e., the intake valves 98 are opened), the respective intake passages 94 communicate with the associated combustion chambers 80.

The plenum chamber 92 functions as an intake silencer and/or a coordinator of air charges. In the illustrated arrangement, a plenum chamber member 100 defines the plenum chamber 92 and is mounted on the port side of the crankcase member 82. The plenum chamber member 100 preferably has an air inlet opening (not shown) that opens to the closed cavity 58. The illustrated intake passages 94 extend rearwardly from the plenum chamber member 100 along the cylinder block 70 on the port side and then bend toward the intake ports 96. Air is taken into the plenum chamber 92 from the cavity or engine compartment through the inlet opening. The air then is introduced into the combustion chambers 80 through the intake passages 94 and the intake ports 96.

The illustrated intake passages 94 are defined by intake ducts 104, which are preferably formed with the plenum chamber member 100, intake manifolds 106 connected to the associated intake ports 96 and throttle bodies 108 interposed between the intake ducts 104 and the intake manifolds 106. In the illustrated arrangement, the respective throttle bodies 108 support butterfly-type throttle valves 110 in a manner that allows pivotal movement of the valves 110 about axes defined by valve shafts 112 that extend generally vertically. The valve shafts 112 preferably are linked together to form a single valve shaft assembly 112 that passes through all of the throttle bodies 108. The shaft assembly 112 in the illustrated arrangement is supported for rotation at the outer surfaces of the pair of throttle bodies through which each portion of the shaft assembly 112 passes (see FIG. 6). Preferably, a bearing 113 is positioned within a boss formed at these locations on the throttle bodies 108. The bearing 113 supports the loads on the shaft 112 and allows the shaft 112 to rotate generally freely even while the shaft is radially loaded.

With reference to FIG. 2, the valve shaft assembly 112 can be operable by the watercraft operator through a suitable mechanism that can comprise a throttle cable 114, a non-linear linkage 116, a control lever 118 and a bias spring 120. In the illustrated arrangement, the control lever 118 and the bias spring 120 generally are placed in a space 122 defined between the two upper intake passages 94 and the two lower intake passages 94. When the operator operates the throttle cable 114, the mechanism actuates the valve shaft assembly 112 to open the throttle valves 110. Conversely, when the throttle cable 114 is released, the mechanism actuates the valve shaft assembly 112 to close the throttle valves 110. Preferably, the spring 120 operates to close the valves when the opening force provided by the cable 114 is removed or reduced. A rapid closing of the throttle valve, as used herein, occurs when the valves are closed by the restorative force of the spring 120 without any opening biasing force provided by the throttle cable 114. Of course, in some arrangements, an electronic control mechanism can be used to open and close the throttle valves. For instance, a stepper motor can be used to move the throttle valves.

The throttle valves 110, thus, admit a proper amount of air into the intake passages 94 in proportion to an opening degree or opening position thereof. In other words, a certain amount of air measured by the throttle valves 110 is introduced into the combustion chambers 80 through the intake passages 94. Under a normal running condition, the larger the amount of the air, the higher the speed of the engine operation. When the throttle valves 110 are in a generally closed position, the opening degree at this position is defined as zero degrees. The throttle valves 110 preferably do not reach complete closure, even in the zero position, and movement of the throttle valves 110 preferably stops at approximately one degree to allow a small amount of air to flow through. This amount of air can keep the engine operating in an idle state. In addition, small holes can be formed in the throttle valve 110 or a bypass passage can be arranged to allow a small level of air flow even if the throttle valves are completely closed.

The engine 54 also preferably includes an exhaust system that directs burnt air-fuel charges or exhaust gases to a location outside of the outboard motor 30. With reference again to FIG. 3, a set of exhaust ports 124 are defined in the cylinder head assembly 78 and are repeatedly opened and closed by a corresponding set of exhaust valves 126. When the exhaust ports 124 are opened, the combustion chambers 80 communicate with an exhaust manifold 128 which collects the exhaust gases and directs them away from the combustion chambers 80. With reference again to FIG. 1, the exhaust gases, in major part, are discharged into the body of water surrounding the outboard motor 30 through an exhaust passage 130 formed in an exhaust guide member, on which the engine 54 is mounted, an exhaust pipe 132 and an exhaust expansion chamber 134, which are formed in the driveshaft housing 50, and other internal passages formed in the lower unit 52.

An intake camshaft 138 and an exhaust camshaft 140 are journaled for rotation and extend generally vertically in the cylinder head assembly 78. The intake camshaft 138 actuates the intake valves 98 while the exhaust camshaft 140 actuates the exhaust valves 126. The camshafts 138, 140 have cam lobes 142 thereon to push the respective valves 98, 126. The associated ports 96, 124 are thus opened and closed repeatedly.

Preferably, the crankshaft 86 drives the camshafts 138, 140. Each camshaft 138, 140 has a sprocket 146, while the crankshaft 86 also has a sprocket 148. A timing belt or chain 150 is wound around the respective sprockets 146, 148. The crankshaft 86 therefore drives the camshafts 138, 140.

The illustrated engine 54 further includes a fuel injection system 154. The fuel injection system 154 preferably employs four fuel injectors 156 with one fuel injector allotted for each of the respective combustion chambers 80. Each fuel injector 156 has an injection nozzle that is exposed to the associated intake passage 94 such that the illustrated engine is indirectly injected. The injection nozzle preferably is opened and closed by an electromagnetic unit, such as a solenoid, which is slideable within an injection body. The electromagnetic unit generally comprises a solenoid coil, which is controlled by electrical signals. When the nozzle is opened, pressurized fuel is released from the fuel injectors 156. In the illustrated embodiment, the injection nozzle is directed toward the combustion chambers 80. Of course, in some arrangements, the fuel injectors can be disposed to inject fuel directly into the combustion chamber rather than indirectly into the combustion chamber through the induction passages. The illustrated fuel injectors 156 thus spray the fuel into the intake passages 94 during an open timing of the ports 96. The sprayed fuel enters the combustion chambers 80 with air that passes through the intake passages 94.

The fuel injection system 154 includes a fuel supply tank 160 that preferably is placed in the hull of the associated watercraft 38. In the illustrated arrangement, fuel is drawn from the fuel tank 160 by a first low pressure fuel pump 162 and a second low pressure pump 164 through a first fuel supply conduit 166. The first low pressure pump 162 preferably is a manually operated pump. The second low pressure pump 164 preferably is a diaphragm-type pump that can be operated by, for example, one of the intake and exhaust camshafts 138, 142. In this instance, the second low pressure pump 164 is mounted on the cylinder head assembly 78. A quick disconnect coupling can be provided in the first conduit 166. Also, a fuel filter 168 can be positioned in the conduit 166 at an appropriate location.

From the low pressure pump 164, fuel is supplied to a vapor separator 172 through a second fuel supply conduit 174. In the illustrated embodiment, the vapor separator 172 is mounted on the intake manifold 106. At the vapor separator end of the conduit 174, a float valve can be provided that is operated by a float 176 so as to maintain a substantially uniform level of the fuel contained in the vapor separator 172.

A high pressure fuel pump 178 is provided in the vapor separator 172. The high pressure fuel pump 178 pressurizes fuel that is delivered to the fuel injectors 156 through a delivery conduit 180. A fuel rail 182 defines a portion of the delivery conduit 180 and is mounted on the cylinder head assembly 78. The fuel rail 182 preferably supports the fuel injectors 156. The high pressure fuel pump 178 in the illustrated embodiment preferably comprises a positive displacement pump. The construction of the pump 178 thus generally inhibits fuel flow from its upstream side back into the vapor separator 172 when the pump 178 is not running. Although not illustrated, a back-flow prevention device (e.g., a check valve) also can be used to prevent a flow of fuel from the delivery conduit 180 back into the vapor separator 172 when the pump 178 is off. This later approach can be used with a fuel pump that employs a rotary impeller to inhibit a drop in pressure within the delivery conduit 180 when the pump 178 is intermittently stopped.

The high pressure fuel pump 178 is driven by a fuel pump drive motor 184 which, in the illustrated arrangement, is electrically operable and is unified with the pump 178 at its bottom portion. The drive motor 184 desirably is positioned in the vapor separator 172.

A pressure regulator 188 can be positioned along the fuel delivery conduit 180 at the vapor separator 172 and preferably limits the pressure that is delivered to the fuel injectors 156 by dumping the fuel back into the vapor separator 172.

A fuel return conduit 192 also is provided between the fuel injectors 156 and the vapor separator 126. Excess fuel that is not injected by the injector 156 returns to the vapor separator 126 through the return conduit 192.

A desired amount of the fuel is sprayed into the intake passages 94 through the injection nozzles at a selected timing for a selected duration. The injection timing and duration preferably are controlled by an ECU (electronic control unit) 194 through a control signal line 196. That is, the solenoid coil is supplied with electric power at the selected timing and for the selected duration. Because the pressure regulator 188 controls the fuel pressure, the duration can be used to determine a selected amount of fuel that will be supplied to the combustion chambers 80. Control strategies relating to the fuel injection system will be described in more detail below.

The engine 54 further includes an ignition or firing system. Each combustion chamber 80 is provided with a spark plug 200 that is connected to the ECU 194. The spark plug 200 is exposed into the associated combustion chamber 80 and ignites an air/fuel charge at a selected ignition timing. Although not shown, the ignition system preferably has an ignition coil and an igniter which are disposed between the spark plugs 200 and the ECU 194 so that an ignition timing also can be controlled by the ECU 194. In order to enhance or maintain engine performance, the ignition timing can be advanced or delayed in response to various engine running conditions. The ECU 194 and its operation will be described in greater detail below.

The ignition coil preferably is a combination of a primary coil element and a secondary coil element that are wound around a common core. Desirably, the secondary coil element is connected to the spark plugs 200 while the primary coil element is connected to the igniter. Also, the primary coil element is coupled with a power source and electrical current flows therethrough. The igniter abruptly cuts off the current flow in response to an ignition timing control signal and then a high voltage current flow occurs in the secondary coil element. The high voltage current flow forms a spark at each spark plug 200.

During engine operation, heat builds in, for example, the cylinder block 70 and the cylinder head assembly 78. Water jackets 204 thus are provided for cooling at least these portions 70, 78. Cooling water is introduced into the water jackets 204 by a water pump 206 from the body of water surrounding the outboard motor 30 and is returned to the body of water after circulating through the cooling jackets. Thus, the engine 54 employs an open loop type cooling system.

In the illustrated arrangement, a flywheel assembly 210 is affixed atop the crankshaft 86. The flywheel assembly 210 preferably includes an AC generator or flywheel magneto that supplies electric power to electrical components including the fuel injection system 154 and the ignition system. A starter motor 212 is provided for driving the crankshaft 86 to start the engine 54. As seen in FIG. 3, the starter motor 212 has a gear portion 214 that meshes with a ring gear 216 of the flywheel assembly 210. When the engine 54 starts, the starter motor 212 drives the crankshaft 68 through the gear connection. Once the engine 54 starts, however, the starter motor 212 immediately ceases operation to reduce the likelihood that the starter mechanism will be damaged.

The AC generator generates AC power and the power preferably is sent to a battery 220 placed in the hull of the watercraft 38 through a rectifier-regulator. The rectifier-regulator converts the AC power to DC power and regulates current and voltage of the power. The DC power of the battery 220 preferably is supplied to the ECU 194 through a power supply line 222 via a main switch 224. The main switch 224 has, for example, a three-position switch mechanism. The power is preferably supplied to the ECU 194 at a first position, then to heavy load equipment such as an electric motor including the fuel pump drive motor 184 at a second position, and to the starter motor 212 at a third position. The main switch 224 can be operated by the watercraft operator and can be selectively turned to any one of the positions. Moving the switch to the third position, however, starts the engine 54. The switch mechanism forcibly moves to the second position from the third position once the engine 54 has started. The main switch 224 then preferably remains in the second position under normal running conditions of the engine 54.

Figure 4:
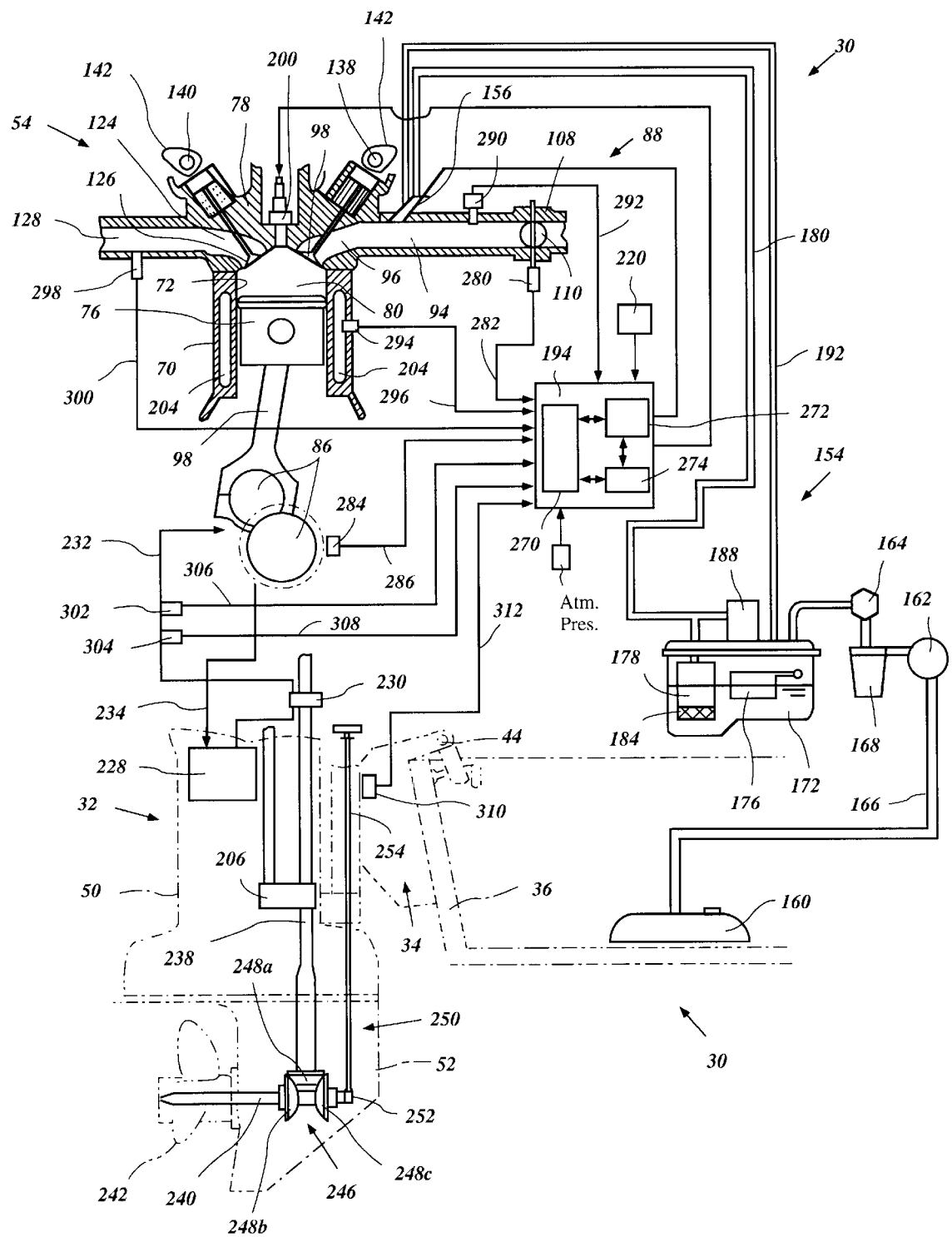
FIG. 4 is a schematic view of the outboard motor of FIG. 1. A portion of the engine is generally shown in the upper portion of the figure. A portion of the outboard motor including a driveshaft housing and a lower unit and the associated watercraft are shown in the lower portion of the figure. A control unit and a fuel injection system link together the two portions of the figure. The lower portion of the outboard motor and the watercraft are generally illustrated in phantom.

The engine 54 still further includes a lubrication system, which is rather schematically shown in FIG. 4, for lubricating certain portions of the engine 54 such as, for example, the interfaces between the connecting rods 88 and the crankshaft 86 and between the connecting rods 88 and the pistons 76. A lubricant reservoir 228 is disposed atop the driveshaft housing 50. Lubricant in the reservoir 228 is withdrawn by a lubricant pump 230 and then is delivered to the portions which need lubrication through a lubricant supply line 232. After lubricating the portions, the lubricant returns to the lubricant reservoir 228 through a lubricant return line 234 and which then repeats this circulation path. That is, the lubrication system preferably is formed as a closed loop.

The driveshaft housing 50 depends from the power head 48 and supports a driveshaft 238 which is driven by the crankshaft 86. The driveshaft 238 extends generally vertically through the driveshaft housing 50. The driveshaft 238 preferably drives the water pump 206 and the lubricant pump 230. As described above, the driveshaft housing 50 also defines internal passages which form portions of the exhaust system.

The lower unit 52 depends from the driveshaft housing 50 and supports a propulsion shaft 240, which is driven by the driveshaft 238. The propulsion shaft 240 extends generally horizontally through the lower unit 52. In the illustrated arrangement, the propulsion device is a propeller 242 that is affixed to an outer end of the propulsion shaft 240 and is driven thereby. The propulsion device, however, can take the form of a dual counter-rotating system, a hydrodynamic jet, or any of a number of other suitable propulsion devices.

A transmission 246 is provided between the driveshaft 238 and the propulsion shaft 240. The transmission 246 couples together the two shafts 238, 240 which lie generally normal to each other (i.e., at a 90° shaft angle) with bevel gears 248a, 248b, 248c. The outboard motor 30 has a switchover or clutch mechanism 250 that allows the transmission 246 to shift the rotational direction of the propeller 242 among forward, neutral or reverse.

In the illustrated arrangement, the switchover mechanism 250 includes a shift cam 252, a shift rod 254 and a shift cable 256. The shift rod 254 extends generally vertically through the driveshaft housing 50 and the lower unit 52. The shift cable 256 extends through the bottom cowling member 62 and then forwardly to a manipulator which is located next to a dashboard in the associated watercraft 38. The manipulator has a shift lever which is operable by the watercraft operator.

The lower unit 52 also defines an internal passage that forms a discharge section of the exhaust system, as discussed above. At engine speed above idle, the majority of the exhaust gases are discharged to the body of water surrounding the outboard motor 30 through the internal passage and finally through an outlet passage defined through the hub of the propeller 242. Of course, an above-the-water discharge can be provided for lower speed engine operation.

With reference now to FIG. 4, the ECU 194 preferably comprises a CPU (central processing unit) chip 270, memory or storage chips 272 and a timer or clock chip 274 which are electrically coupled together within a water-tight, hard box or container. The respective chips preferably are formed as an LSI (large scaled integrated circuit) and can be produced in a conventional manner. The timer chip 274 can be unified with the CPU chip. The memory chips 272 preferably includes ROM (read only memory), RAM (random access memory) and EEPROM (electrical erasable programmable ROM).

The ROM is a non-volatile memory and stores the most basic control programs that will not be erased by the watercraft operator. The programs include various control routines, such as those discussed below.

The RAM is a volatile memory and stores programs and data that are erasable and rewriteable. The RAM preferably stores at least one control map, which can be three-dimensional in some arrangements. The control map preferably has a horizontal axis designating throttle opening degrees (Km), a vertical axis designating engine speeds (Cn) and squares designating amounts of fuel (Amn) corresponding to both the throttle opening degrees and the engine speeds. The respective fuel amounts can be determined to provide an optimal air/fuel ratio in any combination of the throttle opening (Km) and the engine speed (Cn). Of course, less than optimal numbers can be used, where desired. The preferred RAM also can store an adjustment map that contains a relationship between atmospheric pressures and adjustment coefficients of fuel amounts. In the adjustment map, one atmospheric pressure corresponds to one adjustment coefficient. The higher the atmospheric pressure, the greater the specific gravity of air. The adjustment coefficients therefore become greater with increase of the atmospheric pressures. The RAM further stores an engine speed data that is used for determining whether the engine 54 has started. The ECU 194 preferably determines that the engine 54 has started when the engine speed reaches about 300 rpm.

The EEPROM is a non-volatile memory that the operator can erase programs and data stored therein, at least in part, and can rewrite them as he or she desires. In the illustrated arrangement, the EEPROM preferably stores an intake pressure as an atmospheric pressure at which the ECU 194 is been turned on while the engine 54 stands still. More specifically, when the main switch 224 is in the first or second position but the starter motor 212 has not yet operated, i.e., the main switch 224 has not turned onto the third position, then the EEPROM stores the sensed intake pressure as a proxy for atmospheric pressure.

As described above, the preferred ECU 194 stores a plurality of control maps or equations related to various control routines. In order to determine appropriate control indexes in the maps or to calculate them using equations based upon the control indexes determined in the maps, various sensors are provided for sensing engine conditions and other environmental conditions.

Figure 5:
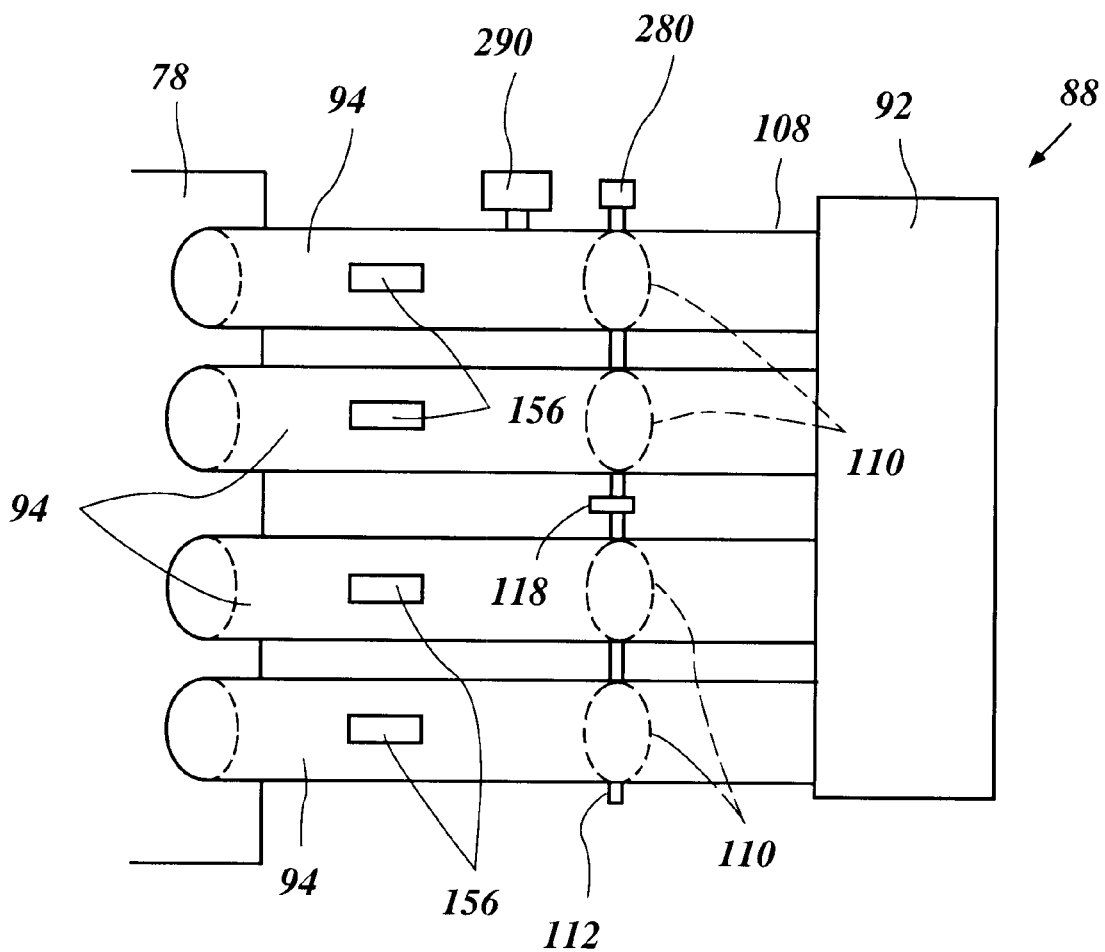
FIG. 5 is a schematic view of at least a portion of an air induction system that is associated with the engine of FIG. 1.

With primarily reference to FIG. 4 and additionally reference to FIGS. 2 and 5, a throttle valve position sensor 280 is provided proximate the valve shaft assembly 112 to sense an opening degree or opening position of the throttle valves 110. A sensed signal is sent to the ECU 194 through a sensor signal line 282. Of course, the signals can be sent through hard-wired connections, emitter and detector pairs, infrared radiation, radio waves or the like. The type of signal and the type of connection can be varied between sensors or the same type can be used with all sensors. The sensed signal also can be used to determine a rate of change of the throttle valve position.

Associated with the crankshaft 86 is a crankshaft angle position sensor 284 which, when measuring crankshaft angle versus time, outputs a crankshaft rotational speed signal or engine speed signal that is sent to the ECU 194 through a sensor signal line 286, for example. The sensor 284 preferably comprises a pulsar coil positioned adjacent to the crankshaft 86 and a projection or cut formed on the crankshaft 86. The pulsar coil generates a pulse when the projection or cut passes proximate the pulsar coil. The sensor 284 thus can sense not only a specific crankshaft angle but also a rotational speed of the crankshaft 86. Of course, other types of speed sensors also can be used.

An air intake pressure sensor 290 is positioned along one of the intake passages 94, preferably at the uppermost intake passage 94, at a location downstream of the throttle valve 110. The intake pressure sensor 290 primarily senses the intake pressure in this passages 94 during engine operation. The sensed signal is sent to the ECU 194 through a sensor signal line 292, for example. This signal can be used for determining engine load. In the illustrated arrangement, the sensor 290 also senses air pressure before the engine 54 starts. The sensed pressure can be a fairly accurate proxy for the atmospheric air pressure.

A water temperature sensor 294 at the water jacket 204 sends a cooling water temperature signal to the ECU 194 through a sensor signal line 296, for example. This signal represents engine temperature.

An oxygen ($O_2$) sensor 298 senses oxygen density in exhaust gases. The sensed signal is transmitted to the ECU 194 through a sensor signal line 300, for example. The signal represents air/fuel ratio and helps determine how complete combustion is within the combustion chambers.

The lubrication system has a lubricant temperature sensor 302 and a lubricant pressure sensor 304 at the lubricant supply line 232. The sensed signals are sent to the ECU 194 through a sensor signal line 306 and a sensor signal line 308, respectively, for example.

A shift position sensor 310 sends a signal indicating a position of the shift rod 254 (forward, neutral or reverse) to the ECU 194 through a sensor signal line 312, for example. A lever operational speed sensor 262 senses a rotational speed of the shift lever 202 and its signal is sent to the ECU 214 through a sensor signal line 264, for example. Of course, other suitable techniques for sensing transmission position and movement can be used.

With reference now to FIGS. 4 and 6–8, a control of the fuel injection system 154 by the ECU 194 will now be described below. Other controls and operations, which are of course simultaneously practiced, will be omitted in this description. In addition, it should be recognized that the control system can be stored as software and executed by a general purpose controller, can be hardwired, or can be executed by a devoted controller.

Figure 6:
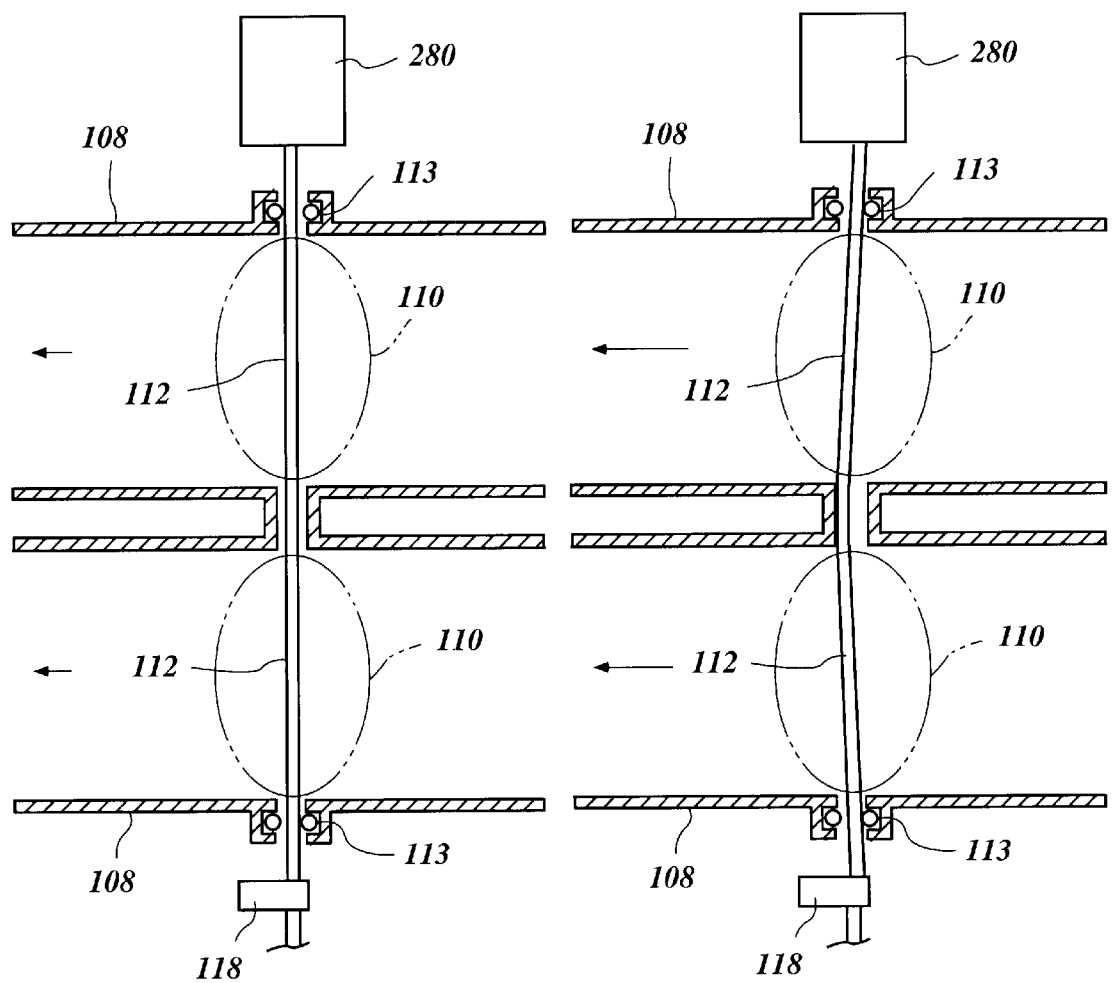
FIG. 6 is a pair of enlarged simplified views of a portion of the air induction system. The two views illustrate flexing of the throttle valve shaft as a result of abrupt closing of the throttle valves.

With reference again to FIG. 6, the throttle valves 110 control a flow of air through the induction system by opening and closing the air flow passage formed in the throttle bodies 108. When the throttle valves 110 rapidly open the air flow through the induction system, the inertia in the system impinges upon the throttle valves 110. The force against the throttle valves 110 can cause the throttle valve shaft 112 to flex as indicated in FIG. 6. In some configurations, the flexing of the shaft 112 can arise as the air flow rate is rapidly decreased. The flexing of the shaft 112 can cause inaccurate readings at the sensor 280, which inaccurate readings then are transferred to the ECU. Thus, in the illustrated arrangement, rapidly opening the throttle valves 110 during engine starting can result in incorrect setting of the fuel amount due to an inaccuracy in sensed air flow.

Figure 7:
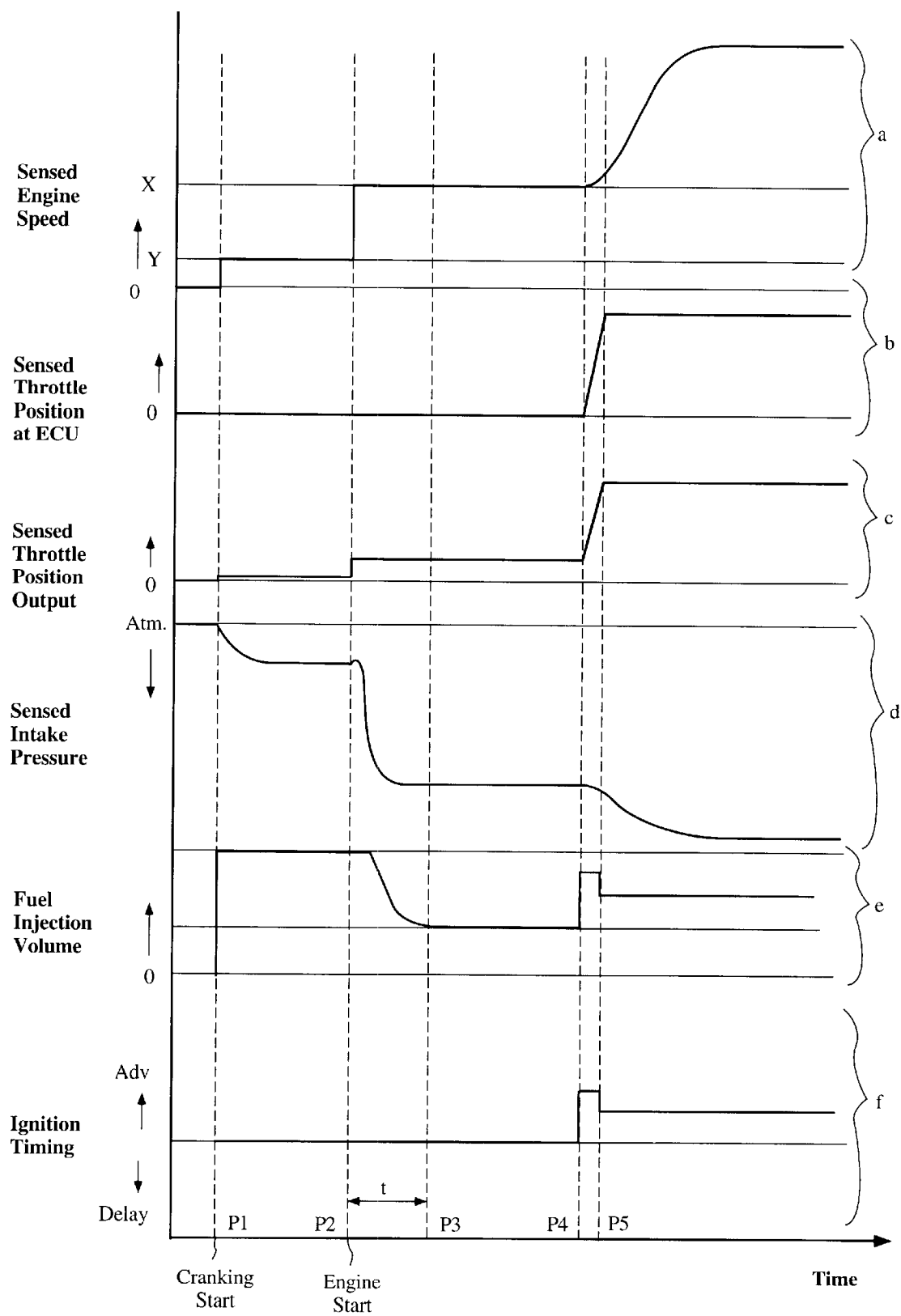
FIG. 7 is a set of graphical illustrations of various engine operating characteristics when the engine is operated in accordance with certain features, aspects and advantages of the present invention.

With reference now to FIG. 7, a graphical illustration of various engine characteristics is presented. The illustrated characteristics result in a system that can reduce the inaccuracies caused during engine start-up. Specifically, as illustrated, the sensed throttle position at the ECU and the actual sensed throttle position vary depending upon the stage of operation of the engine. As illustrated, at a time P1, the operator of the watercraft begins to operate the starter motor. At this time, the engine speed is increased to Y under the motive force of the starter motor. Concurrently with starting rotation of the starter motor, the throttle valve opens a slight amount as illustrated by the step in graph c. At this time, however, the ECU or other controller does not receive a signal indicating that the throttle valve has moved (see graph b). While the starter motor cranks the engine, the pressure within the induction system begins to decrease (see graph d) and the fuel injectors begin injecting fuel into the combustion chambers (see graph e). In the illustrated arrangement, ignition timing is unaffected during engine starting. It should be expected that ignition timing can be advanced or delayed if such a change in ignition timing would be desired.

With continued reference to FIG. 7, at a time P2, the engine fires and the engine begins operating under its own power. Thus, the starter motor is disengaged and the engine operates at a low speed X. Preferably, the low speed operation, or idle operation, comprises the engine turning at approximately 600 revolutions per minute. Of course, other low speeds also can indicate that the engine is operating under its own power. Once the engine begins operating under its own power, the throttle position once again changes in the illustrated arrangement. In particular, the throttle opens to increase the air flow into the engine while the fuel injection amount decreases to lean the air-fuel mixture from the rich starting mixture. Notably, the ECU does not acknowledge that the throttle valve has moved at this time and the fuel injection volume follow a preset routine of decreasing the amount of fuel injected. Moreover, in the arrangement illustrated in FIG. 7, the induction system pressure rapidly decreases and the ignition timing remains constant.

After the engine operates for a preset period of time t, the fuel injection system begins outputting an amount of fuel that is dependent upon throttle position. In the illustrated arrangement, at the time P3, the amount of fuel injected reflects a throttle position and engine speed associated with idling. After the preset period t has expired, the engine is controlled in accordance with a mapped control routine. Preferably, the fuel injection amount varies with both the rate of throttle position change as well as the engine speed and the throttle position.

Figure 8:
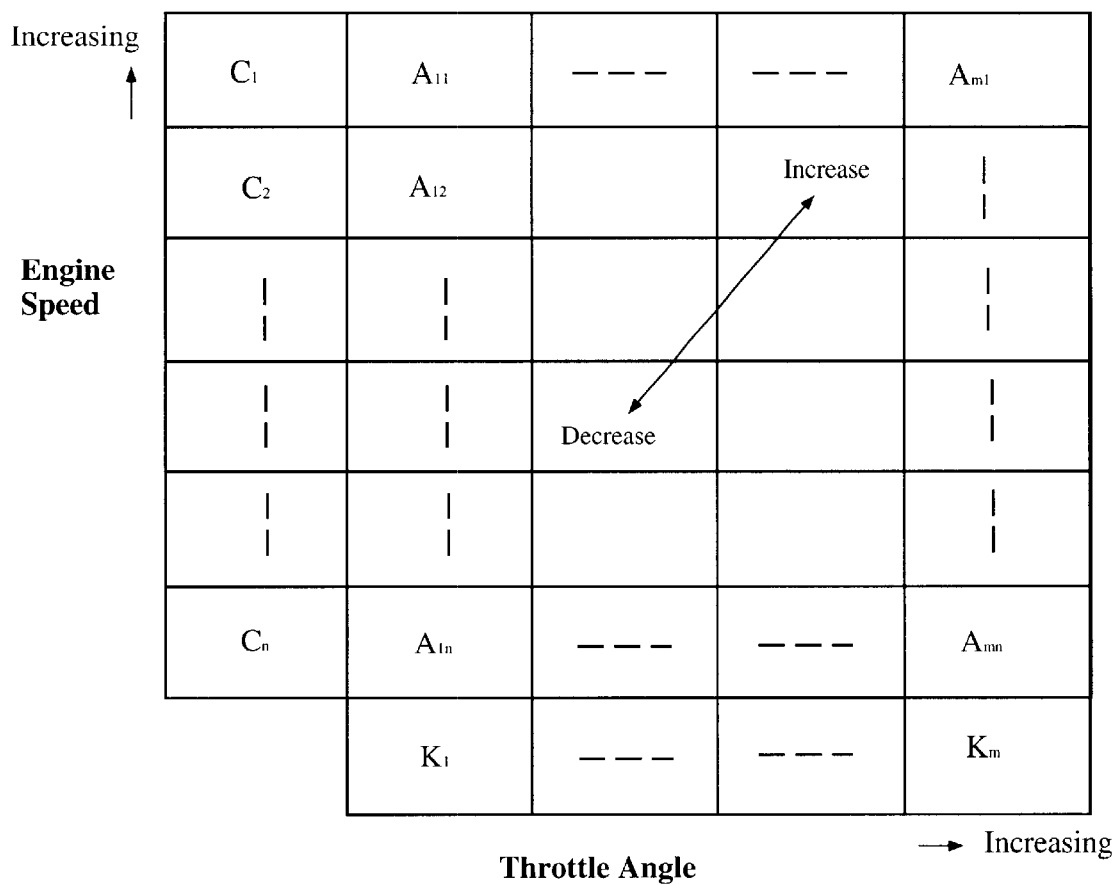
FIG. 8 is a schematic illustration of a first exemplary control map for use in the present fuel injection control system.
Figure 9:
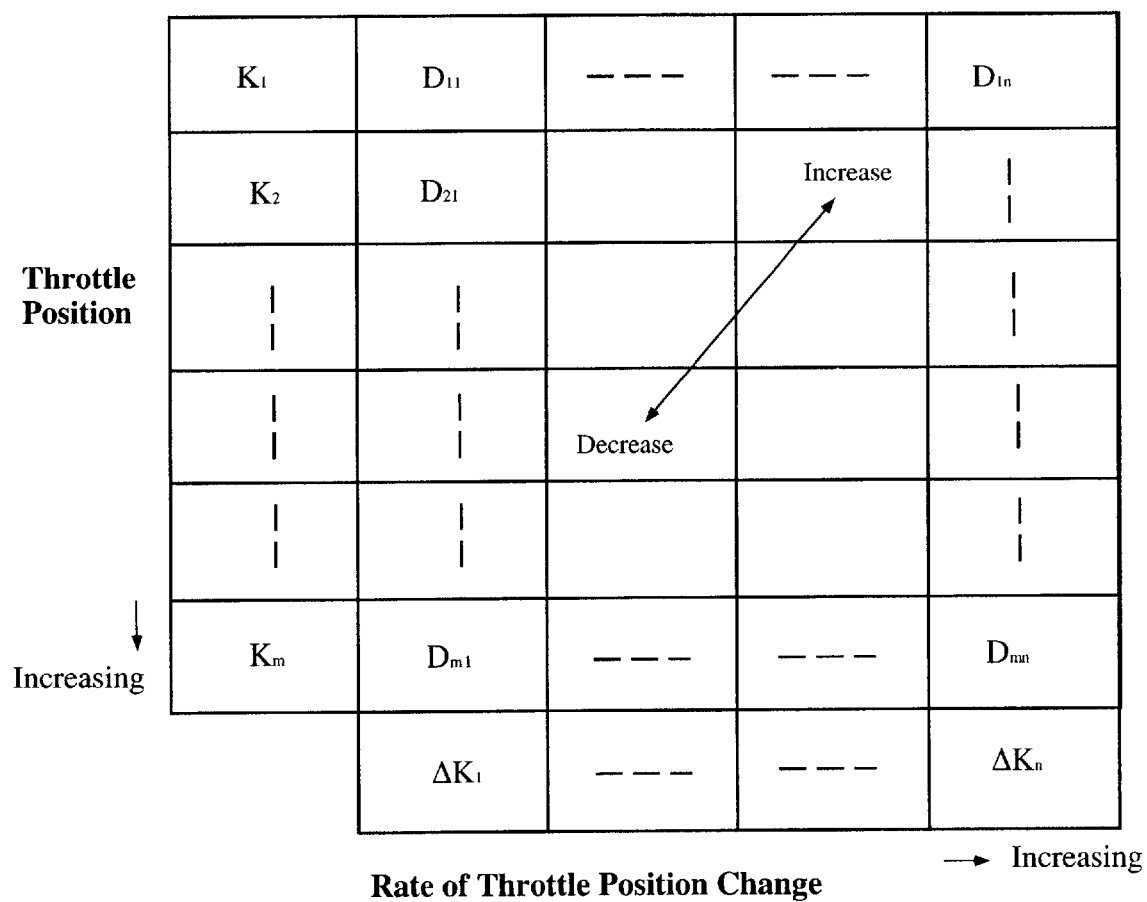
FIG. 9 is a schematic illustration of a second exemplary control map for use in the present fuel injection control system.

For instance, in the illustrated arrangement, a first map, which is illustrated in FIG. 8, is used to determine a base fuel injection amount. In accordance with this aspect of the present invention, the base fuel injection amount is determined from the control map which maps fuel injection amounts against engine speed and throttle position. The base fuel injection amount is altered by adding an amount determined from a second map, which is illustrated in FIG. 9. In the second map of the illustrated arrangement, the fuel injection additive amount is determined based upon throttle valve position and the rate of change of the throttle valve position. The amount of fuel injected, therefore, can reflect both the throttle valve position and the engine speed as well as the throttle valve position and the rate of throttle valve position change. Such a configuration allows the fuel injection amount to better adjust to changes in operator demand. Of course, such a configuration also results in a fuel injection amount that generally is not adjusted when the engine is not accelerating or decelerating. FIG. 7, in graphs (c), (e) and (f), illustrates that if the throttle valve position does not change, the fuel injection amount does not include an additional amount of fuel (see time P5). It should be recognized that by using two separate maps the control system can be designed to only read from one of the maps if the throttle valve is moving such that the control system can operate in a more responsive and energy efficient manner.

Figure 10:
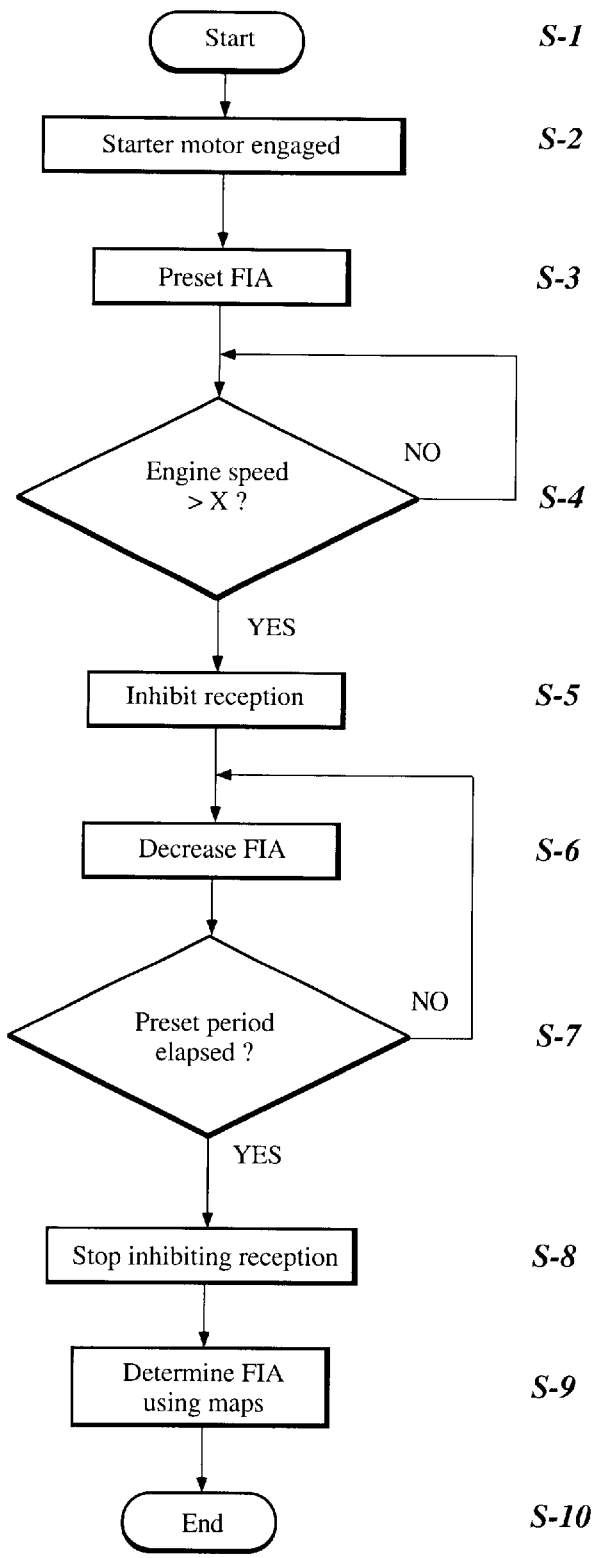
FIG. 10 is a flow diagram for a fuel injection control system having certain features, aspects and advantages in accordance with the present invention.

With reference now to FIG. 10, a presently preferred routine for executing fuel injection control similar to that described above is presented. The routine illustrated in FIG. 10 can be performed by a dedicated controller, can be performed by a controller at the same time as other control routines are being performed or can be performed in any other suitable way. The routine begins and waits for the starter motor to be engaged (see S-1 and S-2). The routine can monitor operation of the starter motor in any suitable manner. In some arrangements, the main switch can be monitored for movement to the start position. In other arrangements, current or voltage supplied to the starter motor can be monitored. In yet other arrangements, such as the illustrated arrangement, engine speed can be monitored. As is known, the speed of the engine under power of the starter motor is below both an idle speed and a trolling speed. Thus, the engine speed can indicate when the starter motor has engaged the engine.

After the starter motor has engaged the engine (see S-2), a preset fuel injection amount or volume is set by the controller (see S-3). The preset fuel injection amount can be preset by the factory when the engine is built or can be adjusted by the operator to adjust the engine characteristics for a particular climate or altitude.

The speed of the engine then is monitored with reference to a preset engine speed X (see S-4). The preset engine speed preferably is chosen to indicate that the engine is operating under its own power rather than under the power of the starter motor. In some arrangements, the preset engine speed X is the idle speed. In the illustrated arrangement, the preset engine speed X desirably is about 300 rpm.

Once the engine speed has exceeded the preset engine speed X, a connection between the controller and the engine speed sensor and/or the throttle valve position sensor is disrupted (see S-5). Of course, in some arrangements, the controller simply stops sampling the output of the sensors while, in other arrangements, the controller continues to sample the output yet does not alter the operational characteristics of the fuel injection amount based on the sampled data.

The controller then steadily decreases the amount of fuel injected by the fuel injectors over a preset period of time (see S-6 and S-7). Preferably, the inhibition of sensor sampling and the decrease in fuel injection amount coincide and persist for approximately the same period of time. In some arrangements, the fuel injection amount is not steadily decreased but is decreased over time in a non-linear manner.

After the preset period of time has elapsed, the controller begins operating the fuel injection system in response to changes in throttle position and engine speed (see S-8 and S-9). In the illustrated arrangement, the controller begins or resumes communication with the engine speed sensor and/or the throttle valve position sensor. The controller also determines the appropriate amount of fuel to be injected by referring to at least one mapped control strategy. In the illustrated arrangement, the first map and the second map are consulted and the basic fuel injection amount and the additive amount are combines to arrive at the amount of fuel to be injected. Of course, the amount of fuel to be injected can be determined by equations or any of a number of suitable control strategies in other configurations. The routine then ends when the engine is shut down (see S-10).

In some arrangements, the ignition timing also can be controlled in a similar manner. For instance, a pair of control maps can be used. One of the pair of control maps can be used to determine a base timing as a function of throttle position and engine speed, for instance. The other of the pair of control maps can be used to determine an adjustment amount for the ignition timing based upon the throttle position and the rate of change of the throttle position. Preferably, such an arrangement can be used to alter the performance of the engine rather than adjusting the fuel injection amount under varied engine operating conditions. For instance, rather than increasing the amount of fuel supplied, the timing can be advanced to increase the engine speed.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Some of the steps of the illustrated control routine can be combined, split or otherwise manipulated. Additionally, some of the steps can be reordered in manners that will be apparent to those of ordinary skill in the art. Furthermore, the overall routine could be completed using several subroutines in a combined manner, for instance. Accordingly, the scope of the present invention is intended to be defined only by the claims that follow.

What is claimed is:

1. An engine for marine applications, the engine comprising at least one cylinder, a piston disposed within said cylinder, a cylinder head enclosing a first end of said cylinder, a combustion chamber being at least partially defined by said cylinder, said piston and said cylinder head, an intake passage communicating with said cylinder head, a throttle valve disposed along said intake passage, a throttle valve position sensor adapted to detect a position of said throttle valve, a fuel injector positioned downstream of said throttle valve, and a fuel control system that is capable of increasing a supplied amount of fuel in proportion to a rate of change of said position of said throttle valve and that does not increase said supplied amount of fuel for a preset period following engine start.

2. The engine of claim 1 wherein said throttle valve is mounted on a throttle valve shaft and said throttle valve position sensor is attached to one end of said throttle valve shaft.

3. The engine of claim 2, wherein said throttle valve shaft extends generally vertically.

4. The engine of claim 3, wherein said throttle valve shaft supports said throttle valve and a second throttle valve, said second throttle valve being positioned within a second intake passage.

5. The engine of claim 4, wherein said throttle valve shaft is journaled at a first end and at a second end and said throttle valve and said second throttle valve are interposed between said first end and said second end.

6. The engine of claim 5, wherein said throttle valve shaft is not supported between said throttle valve and said second throttle valve such that said throttle valve shaft can flex at least at a location between said throttle valve and said second throttle valve.

7. The engine of claim 1, wherein said fuel control system comprises a first map that provides a base fuel supply amount and a second map that provides a supplemental amount of fuel that is dependent upon at least a rate of change of said throttle valve position.

8. The engine of claim 7, wherein said base fuel supply amount and said supplemental amount are summed to arrive at said increased supplied amount of fuel.

9. The engine of claim 1, wherein said fuel injector is mounted along said intake passage to provide indirect fuel injection.

10. The engine of claim 1, wherein said fuel injector is mounted along said intake passage such that fuel ejected from said fuel injector passes into said combustion chamber through an intake port such that said fuel injector provides port fuel injection.

11. A method of controlling a fuel injected engine, said method comprising engaging a starter motor, presetting a first fuel injection amount, decreasing said first fuel injection amount over a preset period of time following engine start, sensing a throttle position and controlling said fuel injection amount based at least in part upon said sensed throttle position after said preset period of time has elapsed.

12. The method of claim 11 further comprising sensing engine speed and said fuel injection amount being further based upon said sensed engine speed.

13. The method of claim 11, wherein said sensed throttle position is sensed only after said preset period of time has elapsed.

14. The method of claim 11, wherein said sensed throttle position is communicated to a controller only after said preset period of time has elapsed.

15. The method of claim 11, wherein said sensed throttle position is communicated to a controller before said preset period of time has elapsed and said controller does not control said fuel injection amount based upon said sensed throttle position until after said preset period of time has elapsed.

16. The method of claim 11 further comprising sensing a rate of throttle position change and said fuel injection amount being further based upon said sensed rate of throttle position change.

17. The method of claim 11, wherein said first fuel injection amount is decreased nonlinearly over time.

18. An engine for marine applications, said engine comprising at least one cylinder, a piston disposed within said cylinder, a cylinder head enclosing a first end of said cylinder, a combustion chamber being at least partially defined by said cylinder, said piston and said cylinder head, an intake passage communicating with said cylinder head, a throttle valve disposed along said intake passage, a throttle valve position sensor adapted to detect a position of said throttle valve, a fuel injector positioned downstream of said throttle valve, and means for increasing an amount of fuel injected based at least partially upon a rate of throttle valve movement only after a preset period of time has elapsed following engine start.

* * * * *